(No Model.) 8 Sheets—Sheet 1.

A. D. COLEMAN.
MACHINE FOR CAPPING AND SEAMING THE ENDS OF CANS.

No. 473,171. Patented Apr. 19, 1892.

Witnesses
Inventor
Arnold D. Coleman (No Model.) 8 Sheets—Sheet 3.
A. D. COLEMAN.
MACHINE FOR CAPPING AND SEAMING THE ENDS OF CANS.
No. 473,171. Patented Apr. 19, 1892.
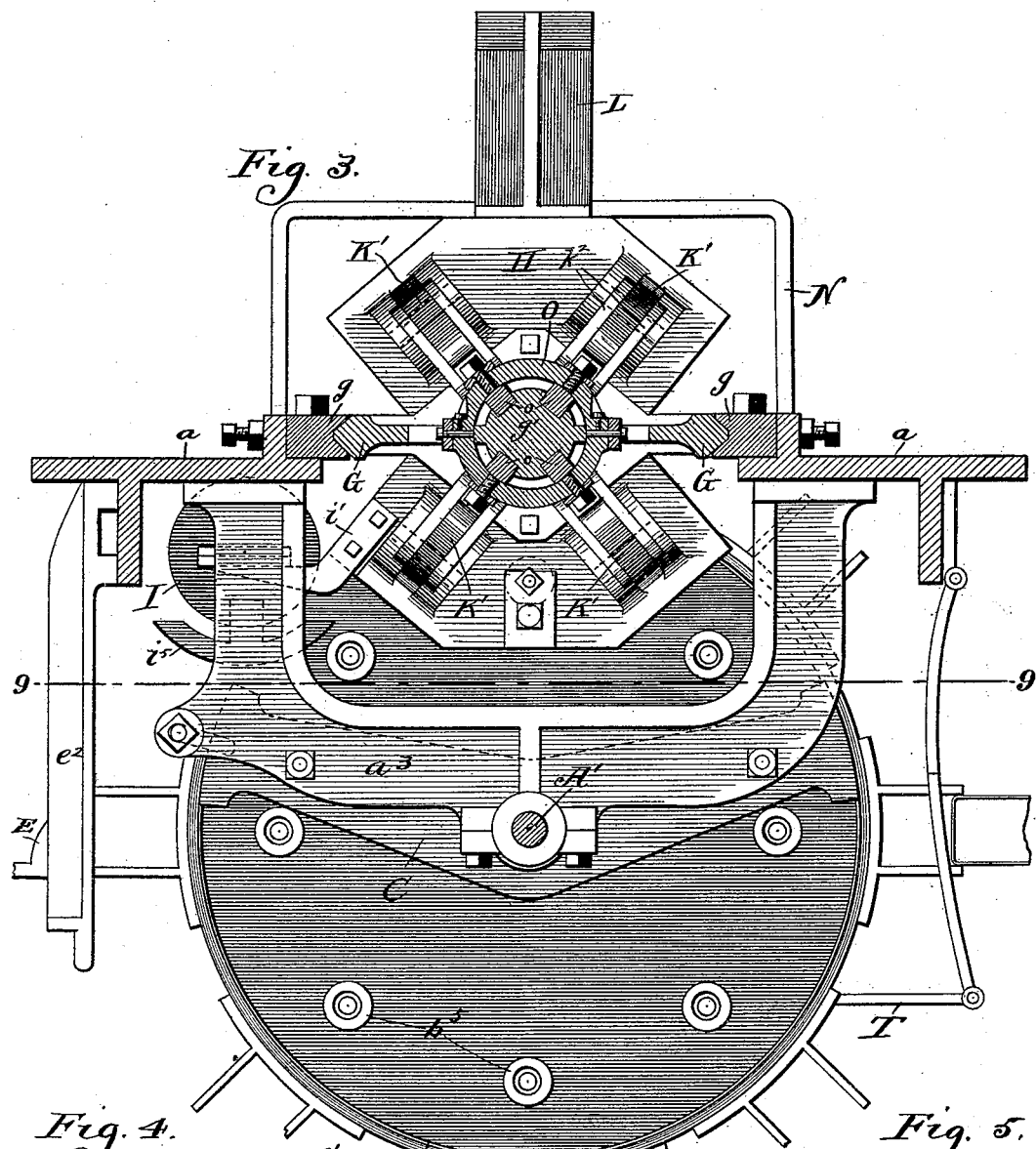
Fig. 3.
Fig. 4.
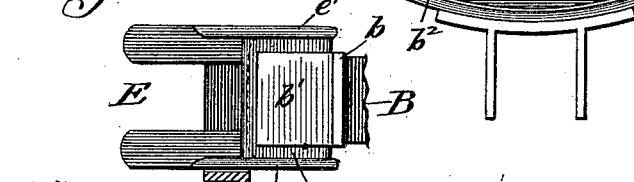
Fig. 5.
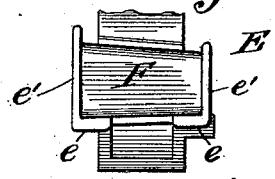
Witnesses
W. C. Coolie
Martin H. Olsen
Inventor
Arnold D. Coleman
By Coleman Thacher
Atty's (No Model.) 8 Sheets—Sheet 5.

A. D. COLEMAN.
MACHINE FOR CAPPING AND SEAMING THE ENDS OF CANS.

No. 473,171. Patented Apr. 19, 1892.

Witnesses
W. C. Corlies
Martin H. Olsen

Inventor
Arnold D. Coleman
By Coburn & Thacher
Atty's (No Model.) 8 Sheets—Sheet 6.
A. D. COLEMAN.
MACHINE FOR CAPPING AND SEAMING THE ENDS OF CANS.
No. 473,171. Patented Apr. 19, 1892.
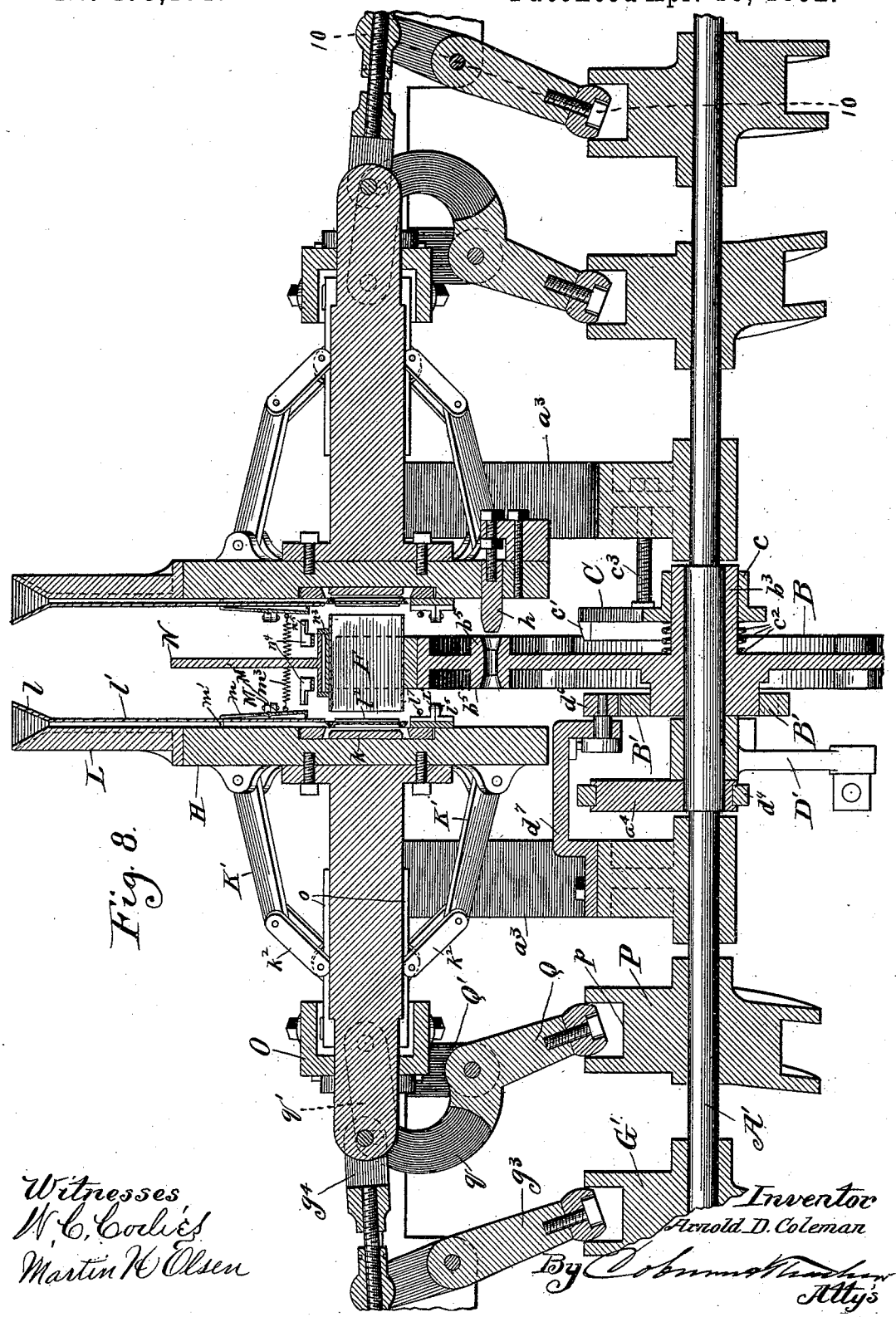
Witnesses
W. C. Coolie
Martin H. Olsen
Inventor
Arrold D. Coleman
By Coburn & Thacher
Attys (No Model.) 8 Sheets—Sheet 7.
A. D. COLEMAN.
MACHINE FOR CAPPING AND SEAMING THE ENDS OF CANS.
No. 473,171. Patented Apr. 19, 1892.
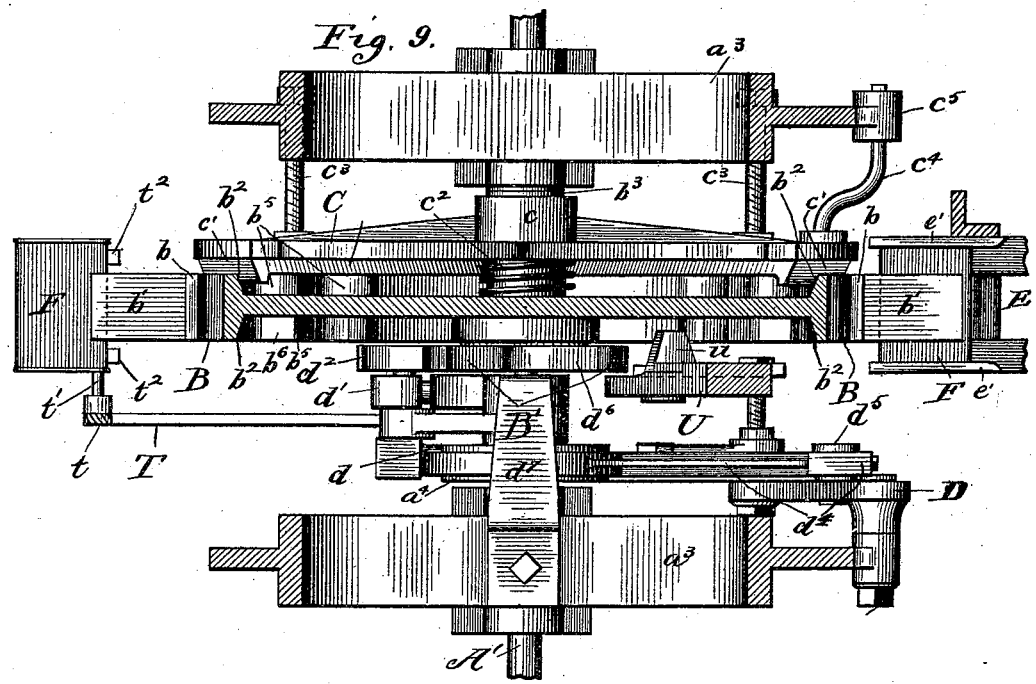
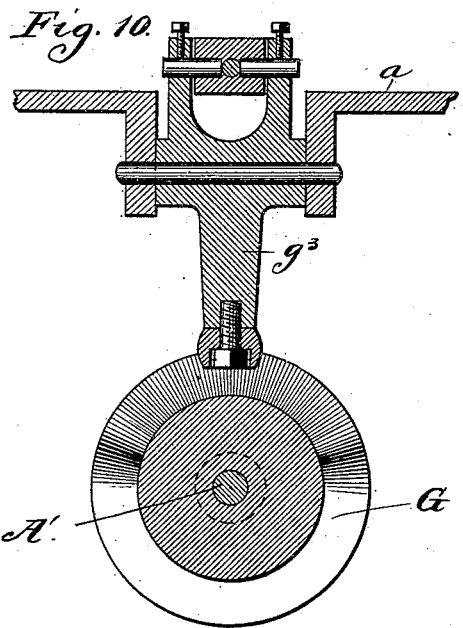
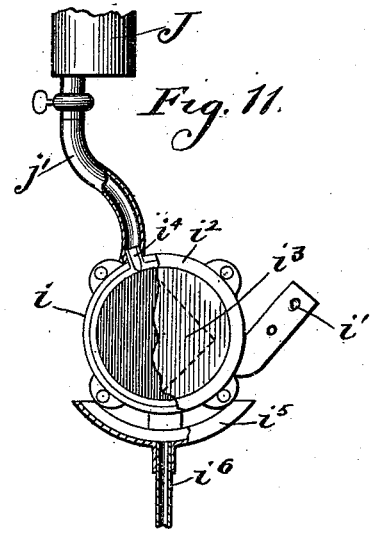
Witnesses
Inventor
Arnold D. Coleman

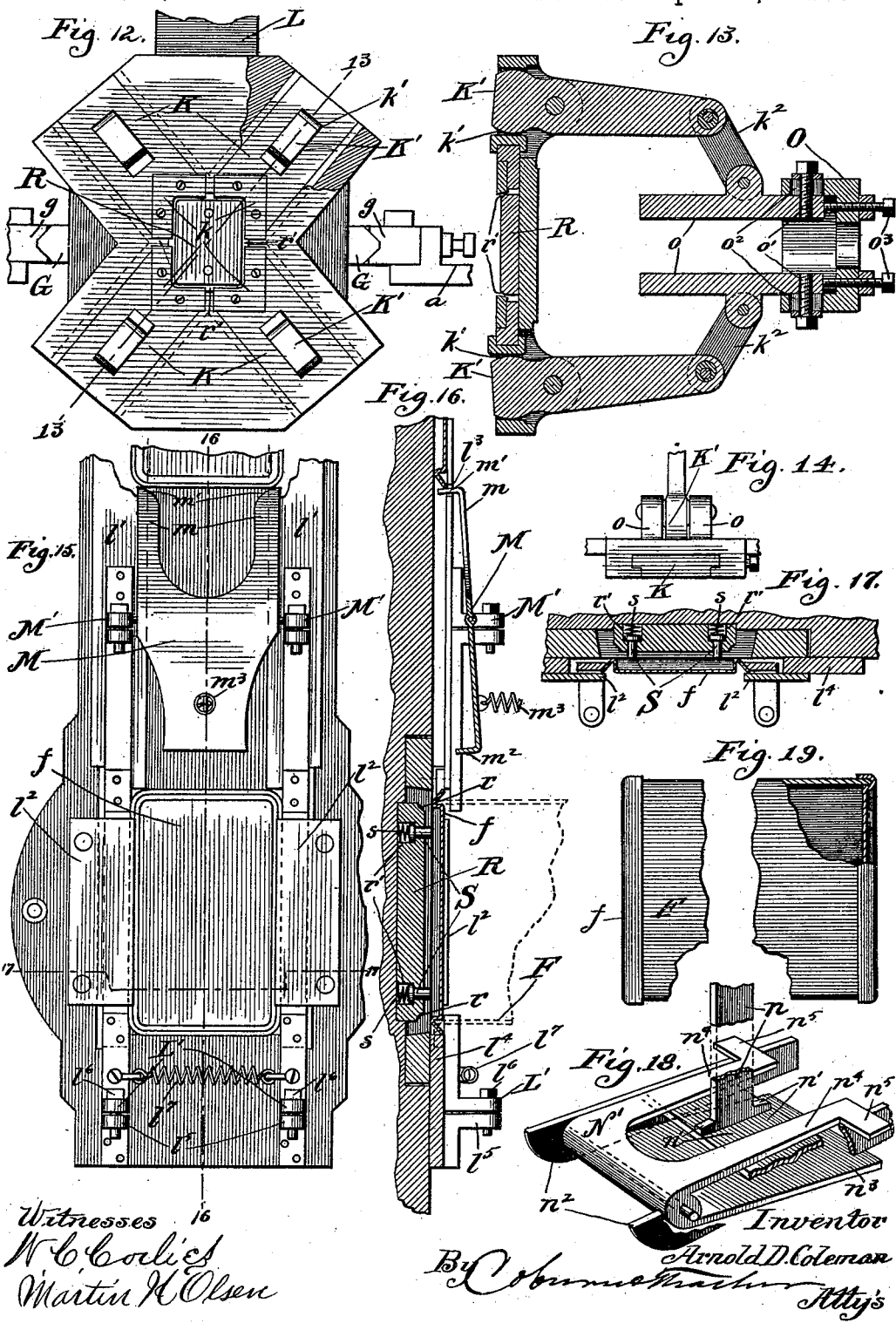

UNITED STATES PATENT OFFICE.

ARNOLD D. COLEMAN, OF CHICAGO, ILLINOIS, ASSIGNOR OF ONE-HALF TO MICHAEL CUDAHY, OF SAME PLACE.

MACHINE FOR CAPPING AND SEAMING THE ENDS OF CANS.

SPECIFICATION forming part of Letters Patent No. 473,171, dated April 19, 1892.

Application filed October 20, 1890. Serial No. 368,669. (No model.)

*To all whom it may concern:*

Be it known that I, ARNOLD D. COLEMAN, a citizen of the United States, residing at Chicago, in the county of Cook and State of Illinois, have invented certain new and useful Improvements in Machines for Capping and Seaming the Ends of Cans, which are fully set forth in the following specification, reference being had to the accompanying drawings, in which—

Figure 1:
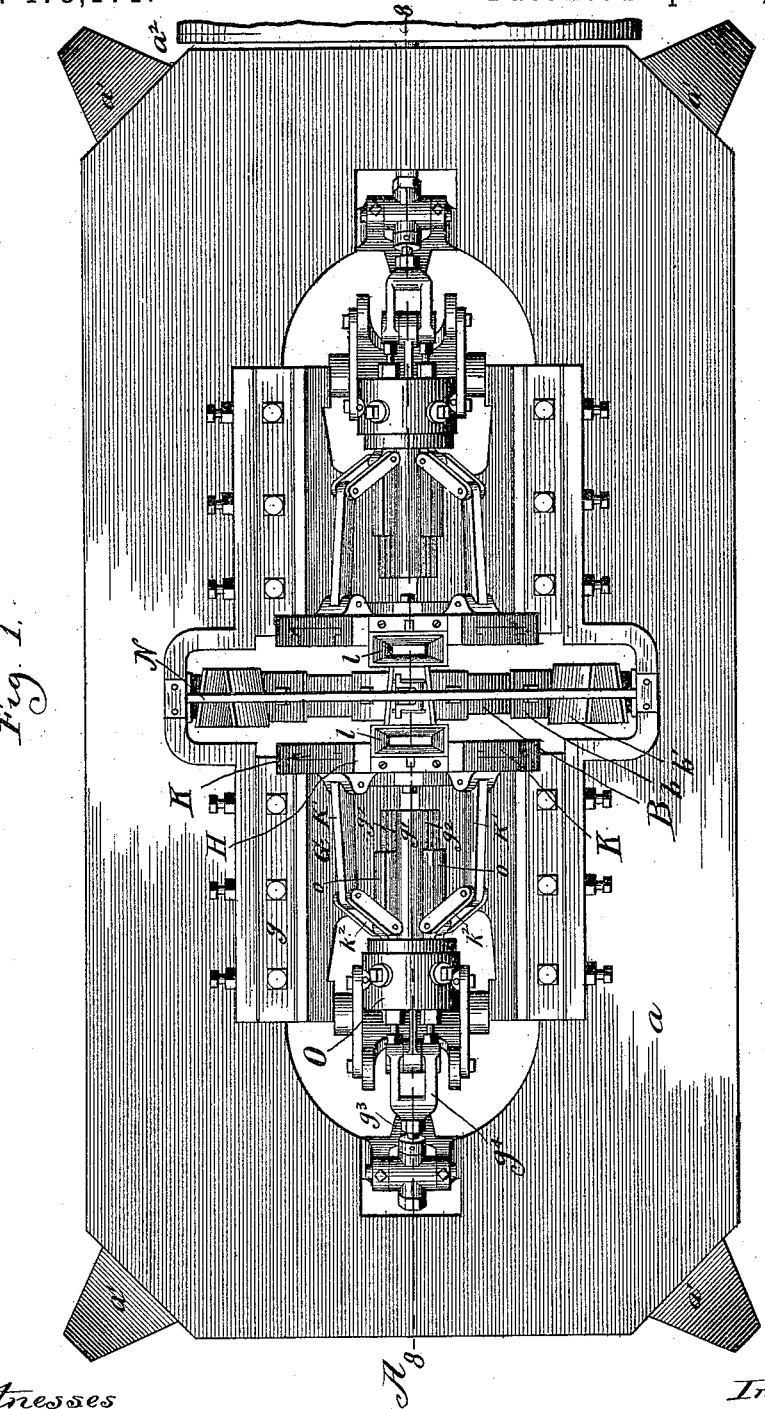
Figure 2:
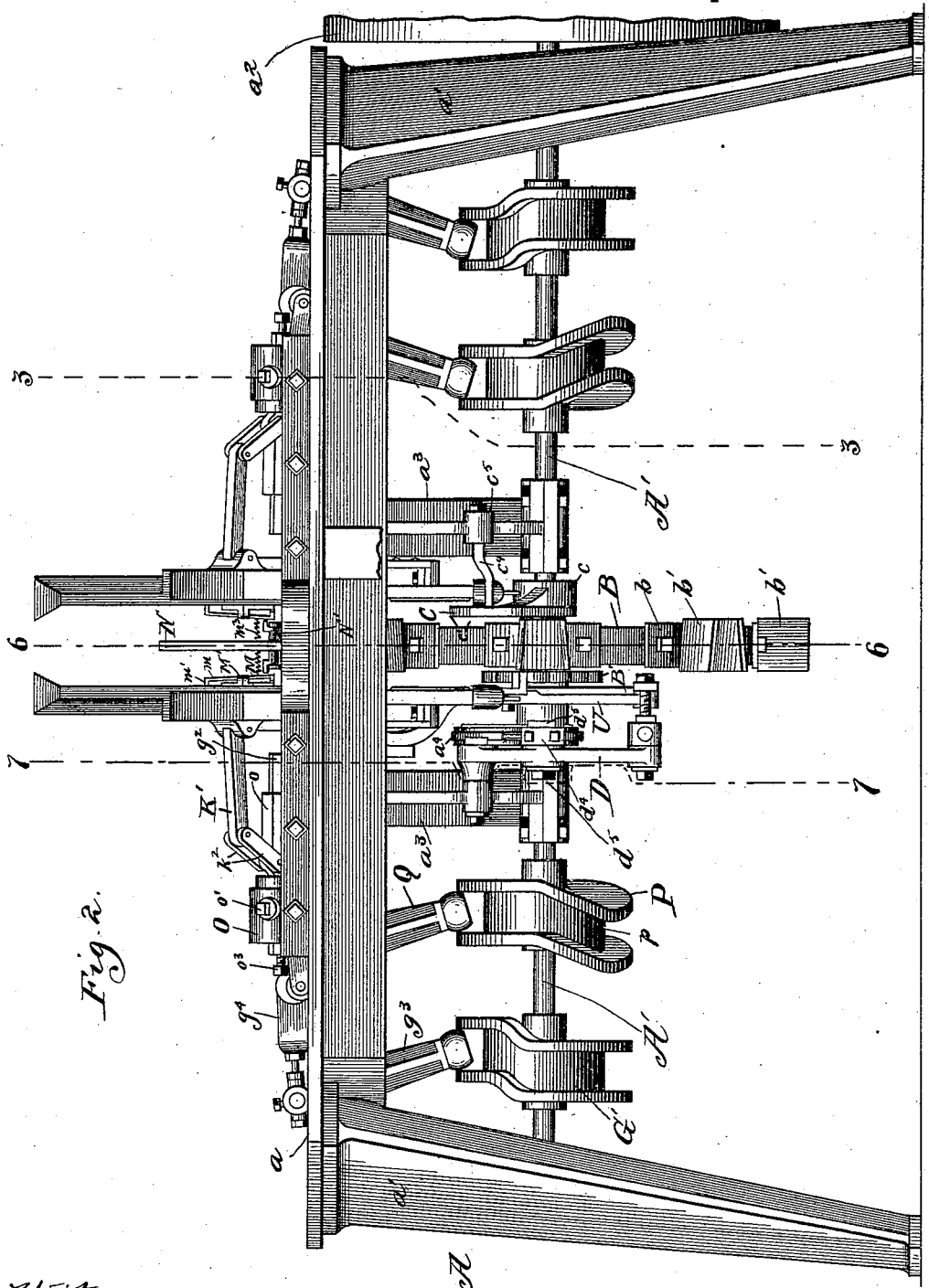
Figure 6:
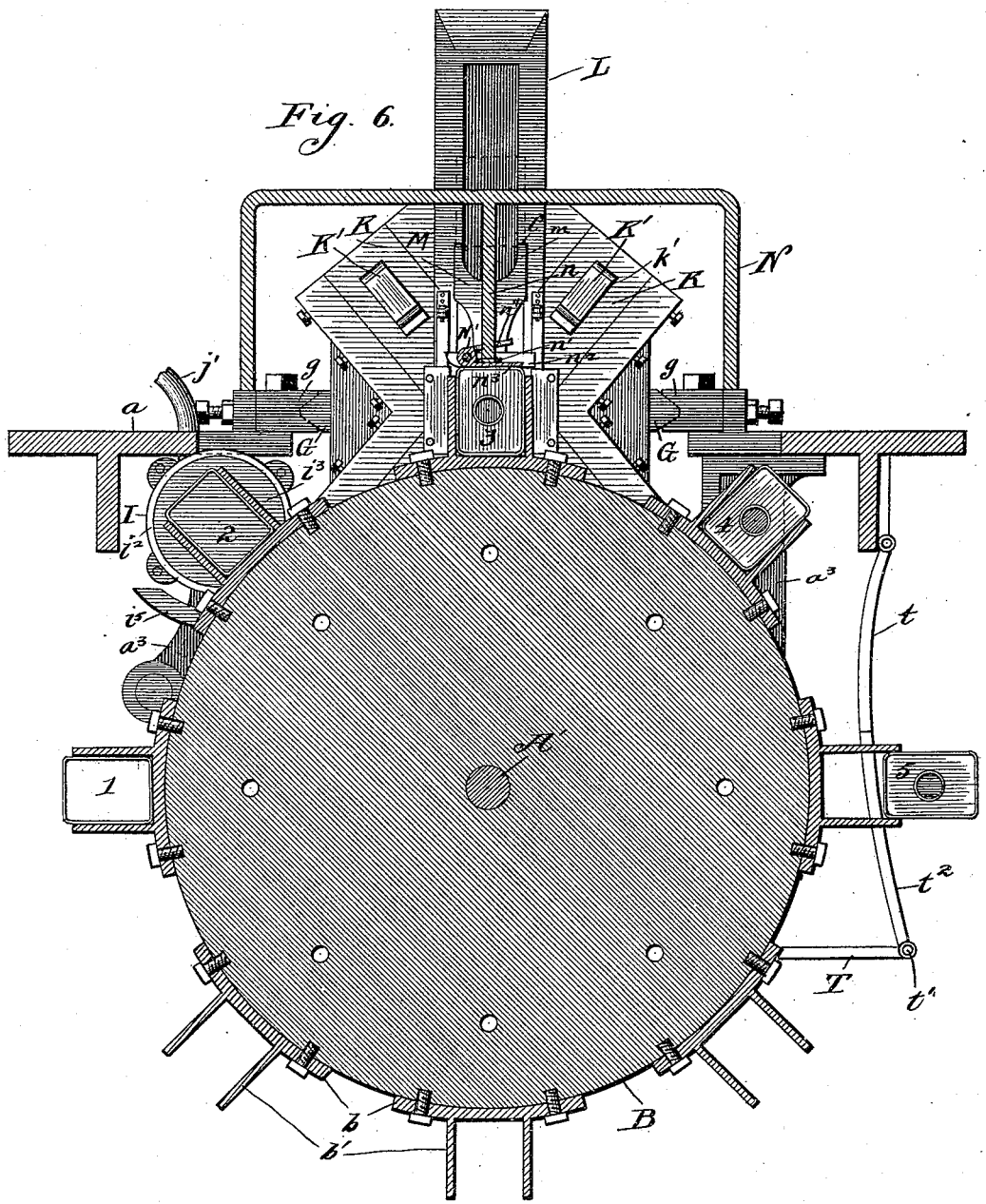
Figure 7:
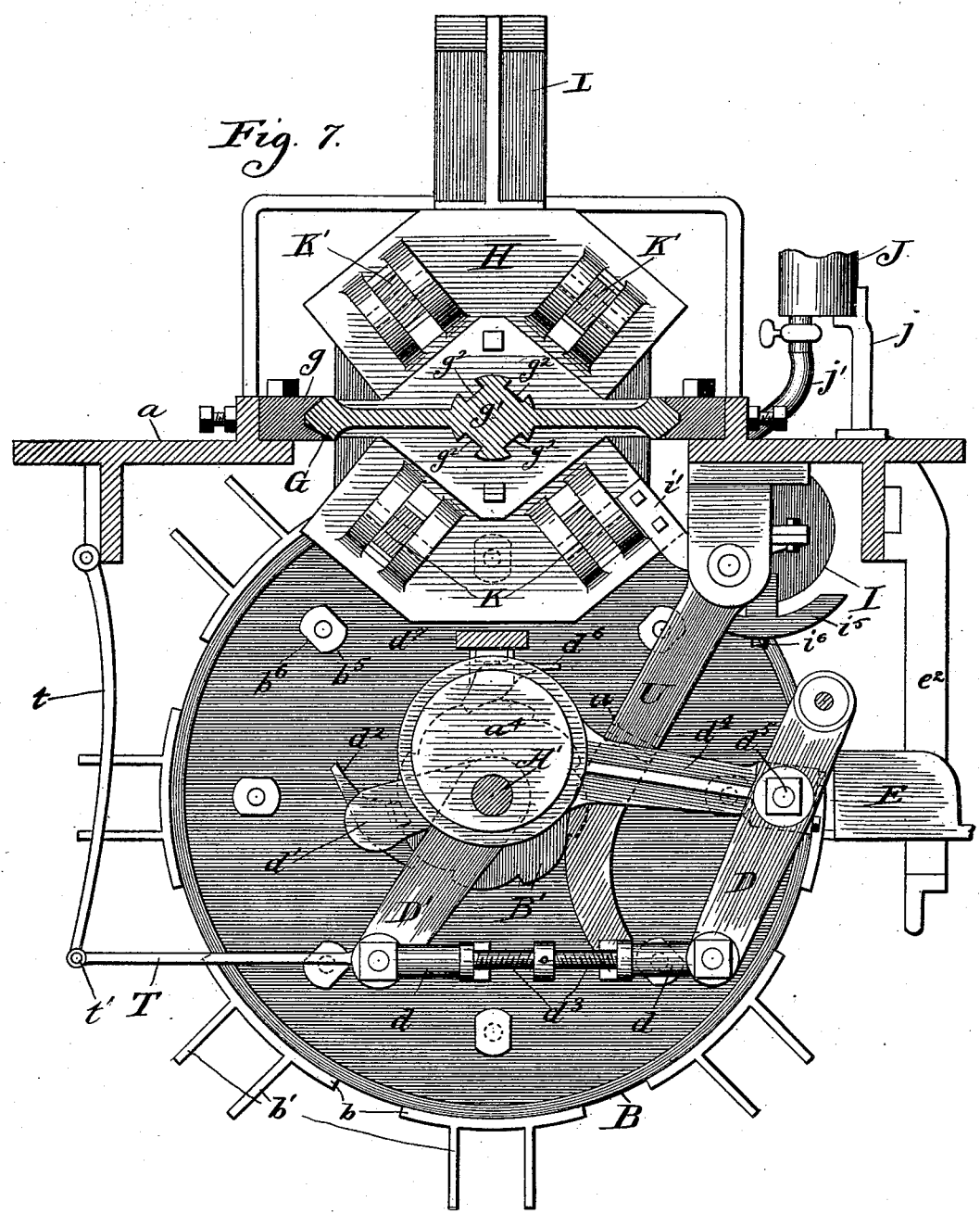

Figure 1 represents a plan view of a machine embodying my improvements; Fig. 2, a front side elevation of the same; Fig. 3, a cross-section of the same, taken on the line 3 3 of Fig. 2; Fig. 4, a detail plan of the outer end of the feed-spout; Fig. 5, a front end elevation of the same with a can-body in place; Fig. 6, a cross-section of the same, taken on the line 6 6 of Fig. 2; Fig. 7, a cross-section of the same, taken on the line 7 7 of Fig. 2; Fig. 8, a longitudinal vertical section taken on the line 8 8 of Fig. 1; Fig. 9, a detail plan section taken on the line 9 9 of Fig. 3; Fig. 10, a detail section taken on the broken line 10 10 of Fig. 8; Fig. 11, a detail elevation of the oiling device shown in Fig. 6, the cloth-covering being partly broken away; Fig. 12, a detail front elevation of the squeezing-dies; Fig. 13, a section of the same, taken on the line 13 13 of Fig. 12; Fig. 14, a detail plan of the outer end of one of the squeezing-dies and its support; Fig. 15, a front elevation of the cap-feeding mechanism detached; Fig. 16, a section of the same, taken on the line 16 16 of Fig. 15; Fig. 17, a plan section of the same, taken on the line 17 17 of Fig. 15; Fig. 18, a detail perspective view of the shifting device for operating the cap-feed lever, partly broken away; and Fig. 19, a side elevation of the capped can, partly broken away.

In the drawings, Figs. 1 and 2 are upon one scale; Figs. 3 to 14, inclusive, upon the same scale, but enlarged from that of Figs. 1 and 2; and Figs. 15 to 19, inclusive, upon the same scale, but still further enlarged. The arrows on the drawings indicate the direction of view in the different sections.

My invention relates to a machine for applying the ends to can-bodies and bending and squeezing the edges together to form the required seam, whereby on a single machine and automatically the cans are prepared ready for soldering.

The invention consists in certain improvements in the devices and mechanisms for accomplishing the different operations required in a machine of this description, as will hereinafter be more distinctly specified.

I do not claim to be the first to produce a machine for the purpose mentioned above, for machines accomplishing this general result are old. I have, however, devised certain new devices and mechanisms whereby I claim to have improved the construction and operation of machines of this class.

I will proceed to describe in detail a complete machine in which I have embodied my invention in practical working form, and will then point out more definitely in claims the special improvements which I believe to be new and wish to secure by Letters Patent.

In the drawings, A represents the supporting-frame of the machine, which, as shown, something resembles a table, the bed $a$ of which is mounted on legs $a'$. The bed is considerably longer than wide and has its central portion cut away. A shaft $A'$ is mounted in suitable bearings on this frame below the bed, running lengthwise of the frame and provided with a driving-wheel $a^2$ on one end. About midway of this shaft a disk or wheel B is mounted loosely thereon, the diameter of which is such that at its crown it comes up nearly to the under plane of the table-bed. Upon the periphery of this wheel segmental plates $b$ are fastened at suitable distances for the several steps in the operations to be performed by the machine, and each of these plates is provided with two vertical flanges $b'$, which are arranged at an angle to each other, however, corresponding to the inclination of the sides of the usual pyramidal can-body, so that they are adapted to receive a can-body slipped in between them. These flanges extend across the plates and are preferably cast therewith. The plates must be arranged so that the wider openings between the flanges will all be on one side of the wheel and the narrower ones on the other. In the drawings the arrangement is such that the wider openings are on the left hand and the narrower ones on the right hand, as seen in Figs. 1 and 2 of the drawings. On each side are hangers $a^3$, depending from the main frame and supporting the main shaft A', on which the wheel is mounted, thus giving a firm rigid support to the shaft and wheel at the center of the machine.

The rim of the wheel B is provided upon its inside with beveled faces $b^2$ on each side of the web, as seen in Fig. 9 of the drawings. A friction-brake C is also mounted on the same shaft as the wheel and adapted to engage with the beveled rim of the latter for regulating its motion. This brake, as shown in the drawings, is a long slightly-arched arm mounted at its center, by means of a sleeve $c$, loosely on the hub-sleeve $b^3$ of the wheel, as seen in Fig. 8. The extremities of this arm extend on each side to the rim of the wheel and are provided with curved bevels $c'$, adapted to engage with the bevel of the wheel-rim. A spring $c^2$ is arranged around the hub-sleeve of the wheel B, between the wheel and the brake, which operates to hold the latter away from the wheel; but the brake is set up into frictional contact with the wheel by means of screws $c^3$, mounted in one of the central hangers $a^3$, these screws being arranged to act upon the respective ends of the brake to move it toward or from the wheel, the brake being free to slide upon its bearing. The friction between the brake and wheel may therefore be nicely regulated, so as to keep the wheel steady, but not seriously interfere with its required movement.

The hub of the wheel B on the side opposite to the brake is provided with a ratchet-wheel B', by means of which an intermittent rotary motion is given to the wheel by the following devices. An eccentric $a^4$ is fixed on the shaft A' a little outside of the ratchet-wheel. A swinging lever D is pivoted at its upper end to the depending hanger $a^3$ on the same side of the wheel B as the ratchet, and is connected at its lower end by a connecting-rod $d$ to a swinging pawl-lever D', mounted loosely on the shaft by the side of the ratchet-wheel. This pawl-lever has an arm $d'$, projecting at one side a little beyond the circumference of the ratchet-wheel, and a spring-pawl $d^2$ is mounted in the outer end thereof in such position as to engage with the teeth of the ratchet-wheel, as seen in Fig. 7. For purposes of adjustment the connecting-rod $d$ is made in two parts, joined by an adjusting-screw $d^3$—a well-known device by means of which the connecting-rod may be lengthened or shortened to nicely regulate the throw of the pawl-lever, so as to give the wheel B just the precise movement required. This pawl mechanism is operated by an eccentric-strap $d^4$, mounted on the eccentric $a^4$ in the usual way, and connected by its stem or arm $d^5$ to the swinging lever D at a point between the pivot of the latter and its lower end, this connection being also pivotal. Obviously the rotation of the eccentric with the shaft A' will impart a vibratory movement to the lever D, and thereby give the necessary reciprocatory motion to the driving-pawl, and so rotate the wheel B with a step-by-step movement. A stationary spring-pawl $d^6$ is mounted on a bracket $d^7$, attached to the depending hanger and extending inward over the eccentric to the ratchet-wheel, this device being arranged so that this fixed pawl is just above the latter wheel, and is arranged to engage with the teeth thereof, thereby acting as a stop-pawl to prevent back movement of the ratchet. I thus provide means for giving the wheel B a step-by-step motion, each revolution of the shaft on which it is mounted carrying it forward a certain uniform distance. The driving-force which thus rotates the wheel, it will be seen, acts against the operation of the brake, which tends to hold the wheel at rest. The movement of the wheel is thus steady, and there is little liability of throwing the latter forward beyond the points where it ought to rest. In order to hold the brake steady and prevent its turning on the shaft, a rod $c^4$ is mounted on the depending hanger $a^3$ outside of the brake and extended inward, being bent toward the shaft to connect with the brake-beam at one end, as seen in Fig. 9. This rod must, of course, have a slight longitudinal movement to accommodate the sliding of the brake-beam, and so it is mounted loosely at its outer end in a supporting-arm $c^5$, projecting from the hanger. The can-bodies are placed in the successive flanged holders on the wheel, and are carried around from station to station thereon, receiving at different stations the successive operations desired and are then discharged at the rear side of the machine. Five stations are occupied by the can from the point of feed to the wheel to the point of discharge therefrom. These five stations are indicated in Fig. 6 by the figures 1, 2, 3, 4, and 5. At the first station the can-body is fed to the wheel. At the second station it is oiled. At the third station the two ends are applied. At the fourth there is no operation, and at the fifth the can is discharged. I will now describe these several operations in their order of succession and the mechanisms by which they are accomplished.

At the front side of the machine there is a small shelf or table E, the central portion of which is depressed, as seen in Fig. 5, so that ledges $e$ appear on each side thereof, and from the outer edges of these latter vertical flanges $e'$ rise, the distance between them being about the same as the length of a can-body. This device is the feed-shelf, and it will be seen from the above description that it is trough-shaped, as seen in the drawings. It is supported by a depending bracket $e^2$, fastened at its upper end to the table of the supporting-frame and arranged directly opposite the periphery of the wheel. This hanging bracket is at such a distance in front of the wheel that the flanges on the latter will readily clear the bracket and so when the wheel is stopped one pair of flanges will be directly opposite the feed-shelf, as seen in Fig. 3, and at each such stop an attendant pushes a can-body F, already on the shelf, in between the flanges on the wheel, the feed-shelf being arranged diametrically of the wheel. The position of the can on the shelf, ready to be shoved in between the flanges on the wheel, is clearly shown in Fig. 5. The next movement of the wheel will bring this can-body up to station 2, where it is oiled by devices which I will now describe. In this connection it will be necessary to also describe some of the devices which enter into the heading mechanism. At each end of the table is a slide-frame G, horizontal in position and mounted in lateral guides $g$, seated on the sides of the table, as seen in Figs. 1 and 7. The guides have V-shaped grooves and the side edges of the slides are correspondingly shaped. The guides are also adjustable laterally on their seats for the purpose of properly centering the slide and also taking up any wear. The central portion of this slide is somewhat enlarged, so as to form a kind of circular core $g'$, in the surface of which are cut four longitudinal grooves $g^2$. The outer or rear end of the slide is cut out some little distance around this core, so that at this end of the slide the core stands alone, with a free space all around it, as seen in Fig. 1. Grooved cams G' are fixed upon the respective outer ends of the shaft A', and above them are levers $g^3$, pivoted to suitable bracket-supports mounted on the table. The lower ends of these levers enter the grooves in the said cams, while at their upper ends they are pivoted to connecting rods or links $g^4$, which at their other ends are connected to the projecting extremities of the slide-cores. These connecting-rods $g^4$ are preferably divided, the two parts being connected by an adjusting-screw, as seen in Fig. 8, so that the length of these connections may be readily adjusted for the purpose of accurately regulating the movement of the slides. Now it is evident that the revolution of the grooved cams G', with the shaft to which they are fixed, will reciprocate the slide-frames G at the respective ends of the table, moving them in and out relatively to the center of the table, where the can-carrier is located. At the inner ends of the slides are the die frames or carriers H, bolted, respectively, to these ends of the slides, so as to be moved in and out with them. An oiler I is fastened to each of these die-carriers, being located on the side toward the front of the machine, so as to bring the oiler in proper position at the station marked 2 in Fig. 6. This oiler consists of a disk $i$, which forms the back of the device, and is provided at one edge with a projecting arm $i'$, by which it is bolted to the die-frame, as seen in Fig. 7. A ring $i^2$ is bolted to the front face of this disk, the two being clamped together by screw-bolts, as seen in Fig. 11. A sheet or covering $i^3$, of canvas or any suitable oil-holding material, is also clamped between the disk and ring and forms the inner face of the oiler. The edges of the disk and ring are raised slightly, so as to provide a slight space between the disk and the oiling fabric. The oil-reservoir J is supported on a bracket $j$, mounted on the table above the oiler I, and is connected with the latter by a flexible tube $j'$, the lower end of which is fitted to a small tubular opening or tip $i^4$ at the upper edge of the oiler and opening into the latter between the disk and the oiling fabric in front. It will be seen that the oiler will move back and forth with the slide-frame G, but the oil-reservoir is stationary on the table. Hence the supply-tube from the latter to the former must be flexible, as described above. Oil trickles down through this tube into the oiler and thoroughly saturates the flexible front. The actuating devices are so arranged relatively that when a can-body is brought up to station 2 and the can-carrier stops the slide-frame G at once moves inward to bring the die-carriers into proper position for applying the ends to the can-bodies. This movement brings up each oiler against the respective ends of the can-body at station 2, and the flexible material, being saturated with oil and pressed against the edges of the can, applies oil thereto. The reverse movement of the slide-frames is just before the can-carrier is moved forward again, so that the oilers and all other devices are out of the way and give no interruption to the forward movement of the carrier with its cans. The surplus oil will trickle over the lower outer edge of the ring $i^2$, and is caught by a drip-pan $i^5$ just below, whence it is conducted off by a drip-tube $i^6$. The next movement of the wheel B will take the can-body to station 3, where the ends, already properly formed, are dropped into position and the edges of the can-body and these ends squeezed together by suitable dies. The mechanism for this operation will now be described. The die-carriers H are of irregular angular shape, as seen in Figs. 7 and 12, and are provided with ways for four quartering die-plates K, these ways being arranged quartering of the carrier, as seen in Fig. 12, so that two dies will be above and two below the plane of the table. The dies proper $k$ are arranged at the inner ends of these slides and are right angled in form, being adapted each to embrace one-quarter of an end of a can, as seen in Fig. 12. An upright receiver L is fastened to the top of each of the die-carriers and extends somewhat above the latter. The edges of these receivers are brought around on the front side of the carriers, so as to partly or wholly cover the front and provide a shallow channel or space between the front and back, as seen in Fig. 8. This channel is adapted to receive the respective can ends singly, and the upper ends of the receivers are preferably provided with flaring mouths $l$ to facilitate the feeding of the ends into these receivers. Strips $l'$ are fastened to the edges of these receivers and also along down the front of the die-carriers to a point just above the plane of the upper side of a can-body when brought into place at station 3, and these strips are bent so as to provide channel-guides for the respective edges of the can ends, as seen in Figs. 15 and 16, so that there are channels provided for the can ends, along which they may drop down from the top of the receivers to position for application to the can-bodies. Just below the guide-strips $l'$ there are also similar strips $l^2$. There is a little space between the strips $l'$ and $l^2$, for a purpose which will be explained presently. These strips $l^2$ are also formed to provide a continuation of the channels above, so that the can ends may drop down inside of these strips into position just opposite the respective ends of the can-body when brought up to station 3. These strips, however, are not quite as long as the adjacent sides of the can ends, so that the corners will be left slightly exposed, as seen in Fig. 15, and they barely project inward over the edges of the latter, so as to hold them in place, while a can-body is brought up into position. The position of a can-body F at station 3 is shown in Figs. 6 and 16, and the position of the can ends $f$ at the lower ends of their channels, ready for application to the can-body, is seen in Figs. 15 and 16. A lever M is centrally pivoted to suitable supports, so that it stands a little above the lower or last position of the can ends and in front of the passage-way, down which they drop. In Figs. 15 and 16 of the drawings this lever is shown mounted on bracket-supports M', which are fastened to the respective guideways at the sides of this passage. The upper end of this lever is forked, as seen in Fig. 15, and each arm $m$ of the fork is rounded outward on each side and has its extremity bent inward at right angles to the lever to form a hook or projection $m'$, which is adapted to pass inward across the guide-channels of the can ends. The guide-strips $l'$ have small openings or slots $l^3$ cut in them for the reception of these projections. The lower end of the lever is narrowed somewhat, so that it may pass within the guide-strips, and its extremity is bent inward to form a hook or projection $m^2$, which is also adapted to pass across and close the passage for the can ends when this lower end of the lever is vibrated inward. A coiled spring $m^3$ connects these two levers on the respective receivers below their pivots, as seen in said Fig. 8, and operates to normally hold the lower ends of the levers outward, as seen in said Fig. 8, in which position the bent projection at the lower ends of the levers will be held out of and away from the passages down which the can ends move; but the similar projections at the upper ends of said levers will be thrown inward and held across said passages at the extreme sides thereof, as seen in Fig. 16. At the bottom of the vertical passage for the can ends is a block $l^4$, fastened to the die-carriers and serving as a stop and rest for the ends at this point. A small right-angled bracket $l^5$ is secured to this block at each end thereof and to it is pivoted a foot or support L', having a similar angle, and the pivot $l^6$ being at the projecting outer ends of the two horizontal arms of these two pieces, as seen in Fig. 16. The lower ends of the lower guide-strips are fastened to these pivoted supports and are loose enough to permit a slight turning outward of these guideways to release the can if there is any sticking after the ends are secured and the die-carriers recede. These pivoted parts are held in normal position by a spring $l^7$, connecting the two on the same carrier, as seen in Fig. 15.

An arched support N extends from one side of the table to the other, midway between the die-carriers, being secured to the respective sides of the table. A depending arm $n$ is fastened to this support and drops down nearly to a level with the table and at its lower end is provided with a foot $n'$, projecting out on each side thereof at right angles, as seen in Figs. 6 and 18. At the extremities of this foot are side bars or pieces $n^2$, extending horizontally beyond each side of the foot and in line crosswise of the table, these parts being rigidly secured together. At the front ends of these side bars—that is, those extending toward the movement of the carrying-wheel—there is pivoted a looped or U-shaped lever N', the pivot being arranged at the junction of the two parts of the lever. This lever is arranged between the two side bars, and its two arms project from the pivot outward toward the rear side of the machine, one member below the supporting-foot and the other above. The lower member $n^3$ is a simple plate extending nearly to the rear ends of the side bars. The upper member $n^4$ is cut out centrally, so as to present a fork which embraces the depending supporting-arm $n$, as seen in Fig. 18, and at the extremity of each fork-arm there is a projecting lug $n^5$, which extends outward over each side bar $n^2$. This U-shaped lever is free to vibrate upon its pivot, and of course when left entirely free will drop down until the projecting lugs rest upon the upper edges of the side bars, as seen in Fig. 18. The supports for this device are so arranged that when in this position the upper arm of the lever, with its side lugs, will be just below the plane of the lower ends of the pivoted stop-levers M; but when lifted, as will be described presently, these projecting lugs will be brought up between the lower ends of said levers.

The die-plates K have each a slot $k'$ near their outer ends, and each slot receives the inner end of a lever K', pivoted to the die-carrier just back of the plates and extending in through the same to enter loosely the said slots, the ends working in the latter being preferably rounded slightly, as seen in Fig. 13. The outer ends of these die-levers are connected by links $k^2$ to a collar O, which is mounted on the central core $g'$ of each slide-frame G and is free to slide back and forth thereon. This collar-slide is secured to the core and guided thereon by separate ribs or splines $o$, which are fitted to the grooves $g^2$ of the said core. It is evident that the connection of this collar to the die-levers, described above, will result in a vibration of the latter by the sliding movement of the former. This movement is effected at each end of the machine by another pair of grooved cams P, which are also fixed upon the main shaft A' and receive into their grooves $p$ the lower ends of levers Q, which are pivoted to brackets Q', depending from the table. The upper ends of these last-named levers are forked, so as to come up on each side of the connecting devices for operating the slide-frames G, and each arm $q$ of the fork is connected by a link $q'$ to the sliding collar O, as seen in Figs. 1 and 13. It is obvious, then, that the vibration of the levers Q, caused by the revolution of the cams P, will reciprocate these collars on the cores of the slide-frames G, and this will produce a vibration of the die-levers by reason of their connection with the collars. The actual connection of the die-levers is to the ribs or splines $o$, as seen in Fig. 13, and these splines are fastened at their outer ends to the collar by means of pins or bolts $o'$, which pass through short slots $o^2$ in the collar itself into the ends of the splines. This loose connection is for the purpose of providing a slight independent movement of the splines on the collar, so that they may be adjusted to regulate the throw of the die-levers, as will be readily understood. This adjustment is effected by means of set-screws $o^3$, passing through the head of the collar and abutting against the ends of the splines, as seen in Fig. 13.

In the center of each die-carrier is a rectangular die-plate R, which constitutes the fixed member of the dies, and is provided with grooved edges $r$, of suitable shape for the inside of the flanges to be formed on the cans. In the back of this stationary die there are small recesses $r'$, in which are fitted the heads or pins S, which project through smaller openings leading from the recesses to the front of the die, and back of these pins are springs $s$, which operate to force the pins outward, so that they project from the face of the die somewhat, as seen in Figs. 16 and 17. These pins are so located that when the die is moved up to the heads of the can the pins will be within the flanges on the can ends and so will strike against the body or central portion of the latter.

After the ends are applied to the can-body by the mechanism just described above the next movement of the carrier-wheel will take the can to station 4. Nothing is done at this station, and the next movement of the wheel takes the can to station 5, where it is discharged by devices which will now be described. A rod T is connected at its inner end to the pawl-lever D' or its connecting-rod $d$. This rod extends directly outward at the rear side of the machine and is there pivoted to a swinging rod $t$, the upper end of which is pivoted to a suitable hanger depending from the table, as seen in Figs. 6 and 7. The outer end of the rod T is also provided with a short arm $t'$, rigidly attached thereto and extending at right angles therefrom over across the plane of the carrier-wheel B, and this rod is provided with two short upright arms $t^2$, arranged at such a distance apart as will permit the said wheel to pass between them, but not a can-body. The location of the rod T is so low with reference to the wheel B that when retracted the short upright arms $t^2$ will be drawn back within the periphery of the wheel and a can brought down to station 5 will pass outside of said arms. Then upon the outward reciprocation of the rod these arms will discharge the can from its pocket on the wheel, as seen in Fig. 6.

The carrier-wheel B is provided with a series of bosses $b^5$, projecting from the web on each side of the wheel, as seen in Figs. 3, 7, and 8. These bosses are perforated, as seen in Fig. 8, and on one side of the wheel the die-carrier H is provided with a pin $h$ below the table, which is adapted to enter one of these perforated bosses when the wheel stops, and the carrier is brought up into position for applying the can-ends. The bosses on the other side of the wheel are flattened on their periphery somewhat, so as to present a flat face $b^6$. A swinging arm U is pivoted at its upper end to a bracket below the table and extends down near the ratchet-wheel, being pivoted at its lower end to the connecting-rod of the swinging lever D, as seen in Fig. 7. This arm is provided on its inner face with a short flange or lug $u$, which is located so that at each stop of the wheel, when its actuating devices are thrown back, it passes over the flat face of one of these bosses and stops the wheel against any accidental forward motion. The pin on the die-carrier, entering one of the perforated bosses, also serves as a stop to the wheel and as a centering device, whereby the wheel is fixed in just the position required for the application of the ends of the can-body.

The operation of this machine is as follows, it being understood, of course, that the actuating devices are constructed and relatively arranged so as to time the movements properly for this purpose: The machine is started and an attendant slips a can-body into each pocket or receptacle on the wheel B as it is brought up to the shelf at station 1 and stops. At each stop of the wheel the slide-frames G are driven inward, as already described, thereby carrying the oilers inward and oiling the ends of the can-body at station 2. This movement of the slide-frames also carries the die-carriers inward into proper position for the application and fastening of the ends to the can-body; but previous to the movement of the first can-body from station 2 to station 3 the feed mechanism for the can ends must be manipulated so as to drop an end on each side down to its lowest position, as seen in Fig. 16, while another one will rest upon the upper end of the feed-lever M, which projects inward across the passage. This is accomplished by vibrating the levers M by hand or in any other way. Now, as the wheel makes its next movement forward the can-body passes under the lever N', thereby lifting it, as seen in Fig. 6, and bringing the side projections on its upper arm opposite to the lower ends of the levers M. The can-body, as seen in Fig. 6, is now in position to receive the ends and the inward reciprocation of the die-carriers, which immediately follows, each one of which holds can ends, brings one of the latter up into proper position upon the respective ends of the body, the edges of the latter being received in the V-shaped channel around the edges of the formed can ends, as seen in Fig. 16. As the die-carriers are brought into this position the lower ends of the levers M will strike against the lateral projections on the upper part of the lever N', thereby forcing the lower ends of the levers M inward and withdrawing their upper ends from the feed-passages of the can ends. The can ends, resting on the upper ends of the said levers, will, therefore, drop into the space below, where they will remain during the operation of the squeezing-dies. The stationary members of each die are within the edges of the respective can ends, the spring-pins in each resting firmly against these ends, as already described. The mechanism for reciprocating the movable die-plates K is immediately brought into operation, thereby bringing the dies $k$ into operation upon the fixed dies and squeezing the bent edges of the ends upon the edges of the can-body, bringing them into the shape shown in Fig. 19. The movable dies are immediately withdrawn and the die-carriers recede, when the spring connecting the two levers M withdraws the lower ends of the said levers from the feed-passages, thereby permitting the can ends, which have dropped down into said levers, to drop into the space below, when the can is carried forward out of the way. This is effected by the next forward movement of the wheel, which takes place simultaneously with the movement of the die-carriers. The completed can is relieved from the guideways, as already described, the lower guide-strips $l^2$ yielding slightly if there is any sticking, and the spaces between the strips $l'$ and $l^2$ permitting the upper corners of the can to be free, as will be seen from an inspection of Fig. 15. The finished can is carried forward by two steps to station 5, where it is discharged, as already described.

Having thus described my invention, what I claim as new, and desire to secure by Letters Patent, is—

1. In a can-ending machine, a single main shaft, in combination with a carrying-wheel mounted loosely on said shaft and provided with peripheral flanges for receiving and holding the can-bodies, reciprocating die-carriers mounted immediately above said shaft, reciprocating dies mounted radially in said carriers, and mechanisms mounted on and connected to said main shaft, whereby an intermittent movement is given to the carrier-wheel, a reciprocating movement to the die-carriers to and from said wheel, and a reciprocating movement to the movable dies on the carriers, whereby all these movements are made by the one shaft, substantially as and for the purposes specified.

2. In a can-ending machine, a carrying-wheel provided with peripheral receptacles for the can-bodies, in combination with mechanism for rotating said wheel intermittently, reciprocating slide-frames, and oiling devices and seaming dies, all mounted on said slide-frames, substantially as and for the purposes specified.

3. In a can-ending machine, a carrier-wheel provided with peripheral receptacles for the can-bodies, in combination with mechanism for imparting an intermittent rotary movement to said wheel, an oiling mechanism, an end-seaming mechanism, and a discharging device for removing the completed cans from said wheel, all arranged to operate at successive stations in the movement of said carrier-wheel, substantially as and for the purposes specified.

4. The main shaft A', provided with an eccentric $a^4$, in combination with the carrier-wheel B, mounted loosely thereon, the ratchet-wheel B', fastened to the carrier-wheel, the swinging lever D, pawl-lever D', connected thereto, and the eccentric-rod $d^5$, connecting the eccentric-strap to said lever D, substantially as and for the purposes specified.

5. The main shaft A', in combination with the carrier-wheel B, mounted loosely thereon, the brake C, also mounted loosely on said shaft, the spring $c^2$, and the adjusting-screws $c^3$, substantially as and for the purposes specified.

6. The main shaft A', in combination with the carrier-wheel B, mounted loosely thereon, the brake C, also mounted loosely on said shaft and extending on each side thereof to the periphery of the wheel, the supporting-arm $c^5$, and the rod $c^4$, connected to the brake to prevent it from turning on the shaft, substantially as and for the purposes specified.

7. The bed or table $a$ of the machine, in combination with the main shaft A', the intermittent rotating carrier-wheel B, mounted on said shaft, the slide-frames G, mounted on the table, the die-carriers H, secured to said frames, the cams G' on the shaft A', and the levers $g^3$, connected to the slide-frames, substantially as and for the purposes specified.

8. The reciprocating slide-frames cut out at their outer ends to provide a central core $g'$, in combination with the die-carriers attached to said frames, the sliding dies mounted in said carriers, and a sliding collar mounted on the core $g'$ and connected to the dies by mechanism whereby the latter are reciprocated by the reciprocation of the collar, substantially as and for the purposes specified.

9. The table or bed $a$, in combination with the slide-frames G, mounted thereon and cut out to provide a central core $g'$, the die-carriers H, secured to said frames, the sliding die-plates mounted in said carriers and provided with slots $k'$, the pivoted levers K', and the sliding collar O, mounted on the core $g'$ and connected by links to the said levers, substantially as and for the purposes specified.

10. The main shaft A', in combination with grooved cams P, fastened thereto, the pivoted levers Q, the slide-frames G, having cores $g'$, the collars O, mounted on said cores and connected to the levers Q, the pivoted die-levers K', the die-carriers H, and the sliding die-plates K, substantially as and for the purposes specified.

11. The slide-frames G, provided with cores $g'$, having longitudinal grooves $g^2$, in combination with ribs $o$, fitted to said grooves, the collars O, mounted on the cores and connected to said ribs $o$, the die-carriers H, and the actuating die-levers K', linked to the ribs $o$, substantially as and for the purposes specified.

12. The oiler I, composed of the disk $i$, in combination with the ring $i^2$, flexible covering $i^3$, and an oil-supply conduit for admitting oil between the disk and covering, substantially as and for the purposes specified.

13. The oiler I, composed of the disk $i$, ring $i^2$, and flexible covering $i^3$, in combination with the die-carriers H, to which it is attached, the oil-reservoir J, and a flexible tube $j'$, connecting said reservoir with the oiler, substantially as and for the purposes specified.

14. The die-carriers H, in combination with the receivers L for the can ends attached to said carriers and provided with guide-channels extending down to the center of the die-carriers, and pivoted levers M, provided with angular projections at each end adapted to be thrust across the said passages for the can ends for the feeding of the latter to the dies below, substantially as and for the purposes specified.

15. The reciprocating die-carriers H, in combination with the end receivers L, attached thereto and provided with continuing channels to the center of the die-frames, the vibrating levers M, provided with angular projections $m'$ $m^2$, the spring $m^3$, connecting the lower ends of said levers, the intermittently-rotating wheel B, and a trip-stop arranged between the die-carriers and adapted to be lifted by projections on the wheel B into the space between the lower ends of the levers M, substantially as and for the purposes specified.

16. The reciprocating die-carriers provided with receivers for the can ends and channels for conducting the same to the dies at the center of the carriers, in combination with the vibrating levers M, provided with projections $m'$ $m^2$, the connecting-spring $m^3$, the vibrating lever N', mounted between the said die-carriers and provided with projecting lugs $n^5$, and the intermittently-rotating wheel B, provided with can-holders, which are adapted to lift the said lever N' when brought up underneath the same, substantially as and for the purposes specified.

17. The reciprocating die-carriers H, in combination with the supporting-arch N, arranged between them, the arm $n$, depending from said arch and provided with a foot $n'$ at its lower end, the pivoted U-shaped lever N', supported by said foot and with its upper arm or member provided with lugs $n^5$, and the can end feed-levers M, connected by the spring $m^3$, substantially as and for the purposes specified.

18. The swinging arm U, provided with the flange $u$ on one side, in combination with the intermittently-rotating wheel B, provided with bosses $b^5$, and the vibrating lever D, connected to the lower end of the arm U, whereby the flange on the latter is brought over a boss on the wheel, thereby providing a stop for the latter, substantially as and for the purposes specified.

ARNOLD D. COLEMAN.

Witnesses:
CARRIE FEIGEL,
A. M. BEST.